United States Patent [19]
Chandler

[11] 3,744,893
[45] July 10, 1973

[54] VIEWING DEVICE WITH FILTER MEANS FOR OPTIMIZING IMAGE QUALITY

[75] Inventor: Jasper S. Chandler, Rochester, N.Y.

[73] Assignee: Eastman Kodak Company, Rochester, N.Y.

[22] Filed: Mar. 19, 1971

[21] Appl. No.: 126,215

[52] U.S. Cl............. 353/75, 350/124, 350/276 SL, 352/104, 353/84, 353/97
[51] Int. Cl..................... G03b 21/22, G03b 21/14
[58] Field of Search......................... 353/75, 97, 84; 352/104, 129; 350/284, 276 R, 276 A, 124

[56] References Cited
UNITED STATES PATENTS

| | | | |
|---|---|---|---|
| 3,561,860 | 2/1971 | Rudolph | 353/97 |
| 2,131,875 | 10/1938 | Hopfield | 350/284 |
| 3,531,178 | 9/1970 | Wirth | 350/284 |

Primary Examiner—Louis R. Prince
Assistant Examiner—Steven L. Stephan
Attorney—Robert W. Hampton, Paul R. Holmes and Lloyd F. Seebach

[57] ABSTRACT

A device for viewing an image projected onto a front surface screen comprises a housing provided with a viewing opening and within which said screen is mounted. Filter means is arranged within the housing between the screen and the viewing opening so as to optimize the luminance of the image reflected by the screen when viewed by an observer through the viewing opening. The filter means in conjunction with a housing shroud which surrounds the viewing opening serve to reduce substantially the ambient light which passes through the filter means and is incident on the screen as well as the ambient light incident on the filter means and reflecting specularly therefrom toward the observer. The light balancing component of the filter means produces a higher color temperature than is possible with commercially available incandescent light sources even though it is operated at less than its rated voltage. The filter means can also include a neutral density component for improving the image brightness and contrast due to the reduced effect of ambient light. The filter means is also used to effectively seal the interior of the housing against dust and dirt from the environs.

11 Claims, 6 Drawing Figures

JASPER S. CHANDLER
INVENTOR.

BY Lloyd F. Seebach

AGENT

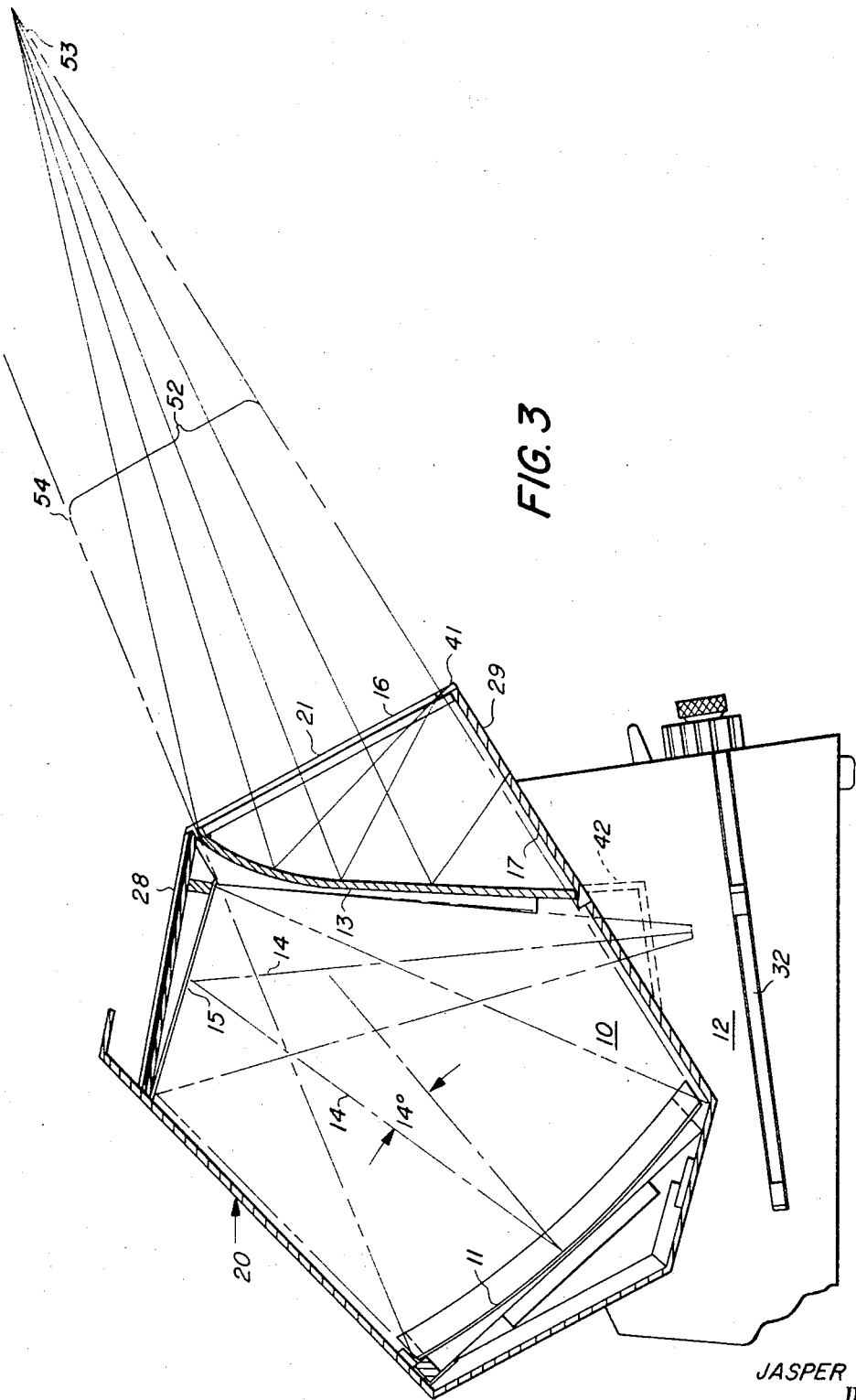

VIEWING DEVICE WITH FILTER MEANS FOR OPTIMIZING IMAGE QUALITY

FIELD OF THE INVENTION

This invention relates to photographic projection apparatus and, more particularly, to a device for viewing an image, which is projected onto a front surface screen, through filter means and together with said filter means providing improved image color correction, image contrast, and ambient light control.

DESCRIPTION OF THE PRIOR ART

In the field of projection apparatus, particularly photographic projection viewers, it has been a matter of continual endeavor to provide a projected image that has maximum contrast and proper color correction so as to enhance the viewing of the image by an observer. In commercially available projection viewers, the image is projected onto either a front surface of a reflection type screen or the rear surface of a transmission type screen. Neither of these types of screen lend themselves to producing a projected image having maximum contrast in ambient light because no completely satisfactory means for preventing the diluting effect of the ambient light incident thereon has yet been devised. With respect to color correction of the projected image, attempts have been made to place suitable filters in the optical projection system; but such filtering arrangements cut down the image brightness so that the problem of image contrast really becomes more acute. In order to provide a control for ambient light incident on the screen, shrouds of various types are provided to, in effect, shield the screen from the ambient light but not to control it. Shroud devices will enlarge the size of the viewer and will exclude only part of the ambient light.

In a projection system in which a high brightness, front surface screen, such as that disclosed in U.S. Pat. No. 3,408,132, is used, a high luminance ratio with a minimal spread angle of the light is achieved. With such a screen the intensity of the light directed to the observer's eyes is increased substantially and a light source, or lamp, of low wattage operated at a reduced voltage can be used. As a result, a viewing device has been devised which is a marked improvement over the known prior art. In order to obtain a lamp life of longer duration, currently available, incandescent lamps can be operated at less than their rated voltage. When an incandescent lamp is operated at normal voltage, the color temperature of the lamp will be several thousand degrees Kelvin below that of typically well-lighted surroundings. When operated at a reduced voltage the lamp temperature is then about 300° to 400° Kelvin lower. If a filter is to be used to correct for color temperature, brightness and ambient light, it must be positioned so that ambient light will not be reflected from the filter surface toward an observer. In U.S. Pat. Application Ser. No. 69,863, filed Sept. 4, 1970, in the name of James J. DePalma and entitled REAR PROJECTION SCREEN, the contrast of an image projected onto a screen is enhanced by giving the image appropriate color temperature correction. This is accomplished by applying a non-scattering, selective or non-selective, dye on the viewing surface of the screen. However, the problems presented with respect to a rear projection or transmission type screen are entirely different from those of a front surface or reflection type screen and each must be considered separately.

SUMMARY OF THE INVENTION

One object of the invention is to provide a device for projecting an image onto a front surface screen and which is viewed through a filter for providing improved image brightness and contrast characteristics.

Another object of the invention is to provide a device for projecting an image onto a front surface screen in which the luminance of the image reflected by the screen and viewed by an observer is optimized.

Yet another object of the invention is to provide a device for viewing an image projected onto a front surface screen in which a light filter, which is arranged between the screen and an observer, reduces substantially any ambient light incident on the screen.

Still another object of the invention is to provide a device for viewing an image projected onto a front surface screen in which a light filter is used not only to compensate for the color produced by a light source operated at less than its rated voltage but also to control the color of the image so as to be compatible with the surrounding ambient light.

A still further object of the invention is to provide a device for viewing an image projected onto a front surface screen in which means is provided to seal the device against dust and dirt from the environs.

These and other objects and advantages of the invention will be apparent to those skilled in the art by the description which follows.

The above objects of the invention are attained by mounting a light filter within the housing of a viewing device and between a front surface screen (reflecting) of the type disclosed in U.S. Pat. No. 3,408,132 and a viewing opening in the housing so that the filter optimizes the luminance of the image reflected by the screen when viewed by an observer through the viewing opening. The filter also effects a seal, with respect to the viewing opening to prevent entry of dust and dirt into the housing from the environs. A blue filter and a neutral density filter are mounted in contacting relationship with a sheet of transparent plastic, such as acetate, for mechanical strength, to provide the filter means. As described hereinafter, under certain conditions the blue filter can be used without the neutral density filter. The blue filter provides for color correction of the projected image, even though a tungsten source of illumination is used and operated at a reduced voltage for obtaining a prolonged lamp life. The color and density requirements of the filter means can also be incorporated in a suitable plastic material to form an integral filter, if necessary. By curving the filter away from or convex to the screen, the size of any overhang or extension which might be used as a shroud against ambient light can be reduced considerably in size, thereby reducing the size of the viewer housing. In addition, the filter, even though curved, does not distort the image projected onto the screen but serves to balance the image brightness from top to bottom on the screen.

DESCRIPTION OF THE DRAWINGS

Reference is now made to the accompanying drawings wherein like reference numerals designate like parts and wherein:

FIG. 3 is a side elevational view similar to that shown in FIG. 1 in which the filter is partially curved in one direction and the housing is shortened;

FIG. 5 is a partial sectional view showing an arrangement for mounting a filter in the viewer housing so as to effect a seal against dust and dirt.

DESCRIPTION OF THE PREFERRED EMBODIMENT

Figure 1:
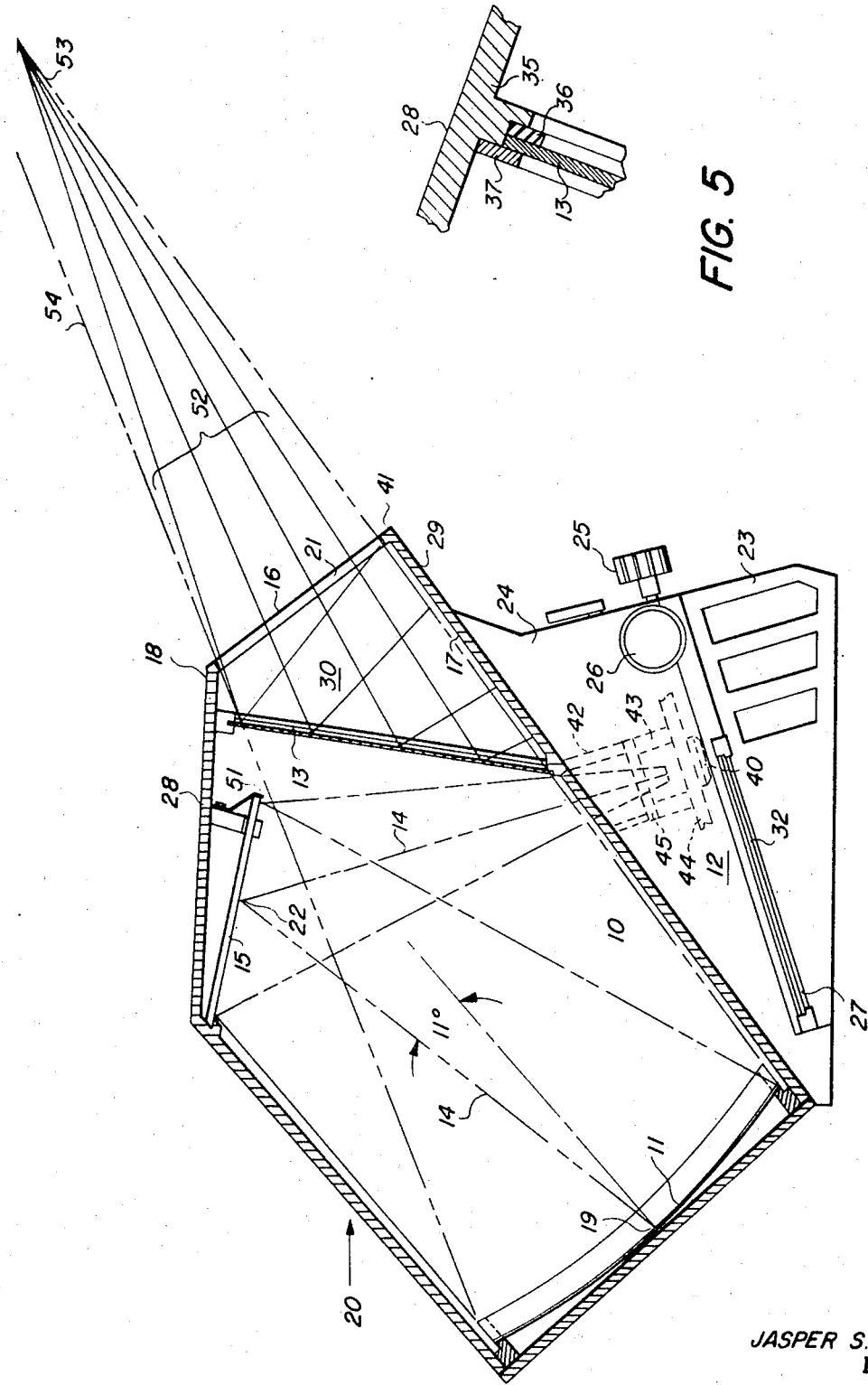
FIG. 1 is a side elevational view of a viewer in accordance with the invention showing the housing thereof in vertical section and in which a planar filter is arranged between the screen and the viewing opening in the housing.

With particular reference to FIG. 1, a viewer 20 comprises a housing 10 which is supported on a base member designated by the numeral 12. The housing 10 contains a front surface (reflecting type) screen 11 of the type disclosed in U.S. Pat. No. 3,408,132 and which provides directional reflectance of any light incident on the surface thereof. Filter means 13 that is arranged relative to a viewing opening 16 in a front wall 21 of housing 10 and between said opening and the screen 11. A mirror 15 is also arranged within housing 10 and relative to screen 11 so that the optical axis 14 of the projection system is incident on mirror 15 at point 22 and on screen 11 at point 19. The imaging rays falling on the screen 11 are spread to fill opening 16.

The base member 12 comprises an illumination unit 23 and a film carrier and projection lens unit 24. The unit 23 includes a lamp and a suitable condenser-lens system as disclosed and described in more detail in my co-pending application Ser. No. 126,216 filed March 19, 1971. Also, the unit 24 carries a projection lens system 40 with respect to which an image carrier medium, such as a photographic paper or film, for example, a microfiche 32, can be moved in a manner as disclosed in the above-mentioned application. A carrier 27 for the microfiche 32 is mounted for movement relative to the unit 24 by knobs 25 and 26 so the microfiche 32 can be moved by the carrier relative to the optical axis 14.

Filter means 13 as shown in FIG. 1, is planar and is mounted in the housing 10 between the opening 16 and the viewing screen 11. The walls 28 and 29 of housing 10 together with the side walls 30, only one of which is shown in FIG. 1, form a generally rectangular shroud 41 surrounding opening 16. The shroud 41 extends from filter means 13 in a direction toward the position in which an observer will view the image reflected by screen 11. The lowest nominal viewing position is designated by the numeral 53. It will be noted that both of the walls 28 and 29 extend beyond filter means 13 with the portion 17 of wall 29 being considerably greater in length than the corresponding portion 18 of wall 28. The interior surfaces of the housing 10 are preferably blackened to reduce light reflection within the housing. The inner surface of each portion of the walls forming the shroud are also blackened to absorb light and thereby reduce light reflection.

Filter means 13 comprises an 80C blue light filter and a neutral density filter whose density factor will depend on the light source and the brightness gain of the screen. If the light output from a source that is used is low, a density filter may not be required. The filter elements are mounted on a support sheet of transparent acetate for mechanical strength and rigidity or can be combined as integral parts of a suitably formulated plastic sheet. Such a light filter structure will correct for the color temperature of the light source and greatly reduce ambient light reaching the observer, thereby enhancing the image contrast, as well as the luminance quality of the image. An 80B blue filter can also be used. 80B and 80C designate Wratten filters of the light balancing type. In actual practice, the density factor of the neutral density filter will therefor range from about 0.4 to zero. In the latter case, no density filter will be required because of the low light output. For a particular light source, the light balancing filter and the density factor of the neutral density filter, if the latter is required, will be chosen so that the luminance of the image reflected by screen 11 will be optimized when viewed through the opening 16 by an observer.

If the light source is an incandescent lamp, such as an automobile lamp rated at 12.8 volts, and is operated at its rated voltage, the life of the lamp will be about 100 hours. If this same lamp is operated at a reduced voltage of about 11.2 volts, the filament produces a color temperature of about 2800 K. With an 80C filter, the color temperature of the lamp will be effectively raised to that of a 4000 K light source on the basis of the black-body locus and its life will be increased to about 500 hours. The density factor of the neutral density filter will depend on the light output of the lamp, the efficiency of the condenser lens system, the speed of the projection lens system and the gain of the screen. The density factor should be such that approximately 120 ft. lamberts will be obtained as a measure of image brightness.

The portion of the housing 10 extending beyond filter means 13, namely shroud 41 comprising portions 17 and 18 and side walls 30, prevents unwanted specular reflection from the filter means as designated by the bundle of rays 52 from reaching the observer's eyes at 53. Any ambient light which might enter the housing 10 through opening 16 will pass through filter means 13 and any reflection of the ambient light within the housing 10 which is not absorbed will again be returned through filter means 13. However, such ambient light will be attenuated by a factor of about 100 in passing twice through filter means 13, if the latter comprises an 80C filter and a neutral density filter having a density factor of 0.4. Ambient light which strikes the screen 11 after passing through the opening 16 and filter means 13 is generally directed toward mirror 15 by reflection from screen 11. For the most part, the light then falls on the black interior of housing 10 and is absorbed, thereby reducing the ambient light returnable through filter means 13 and opening 16. The combined effect of the screen configuration and the filter factor results in very high rejection of ambient light. For example, in one experiment the veiwing device was placed in a 350 foot-candle, ambient environment and no position could be found which would permit more than a fraction of one foot-lambert of luminance to be returned to the viewing position from the ambient source.

Figure 2:
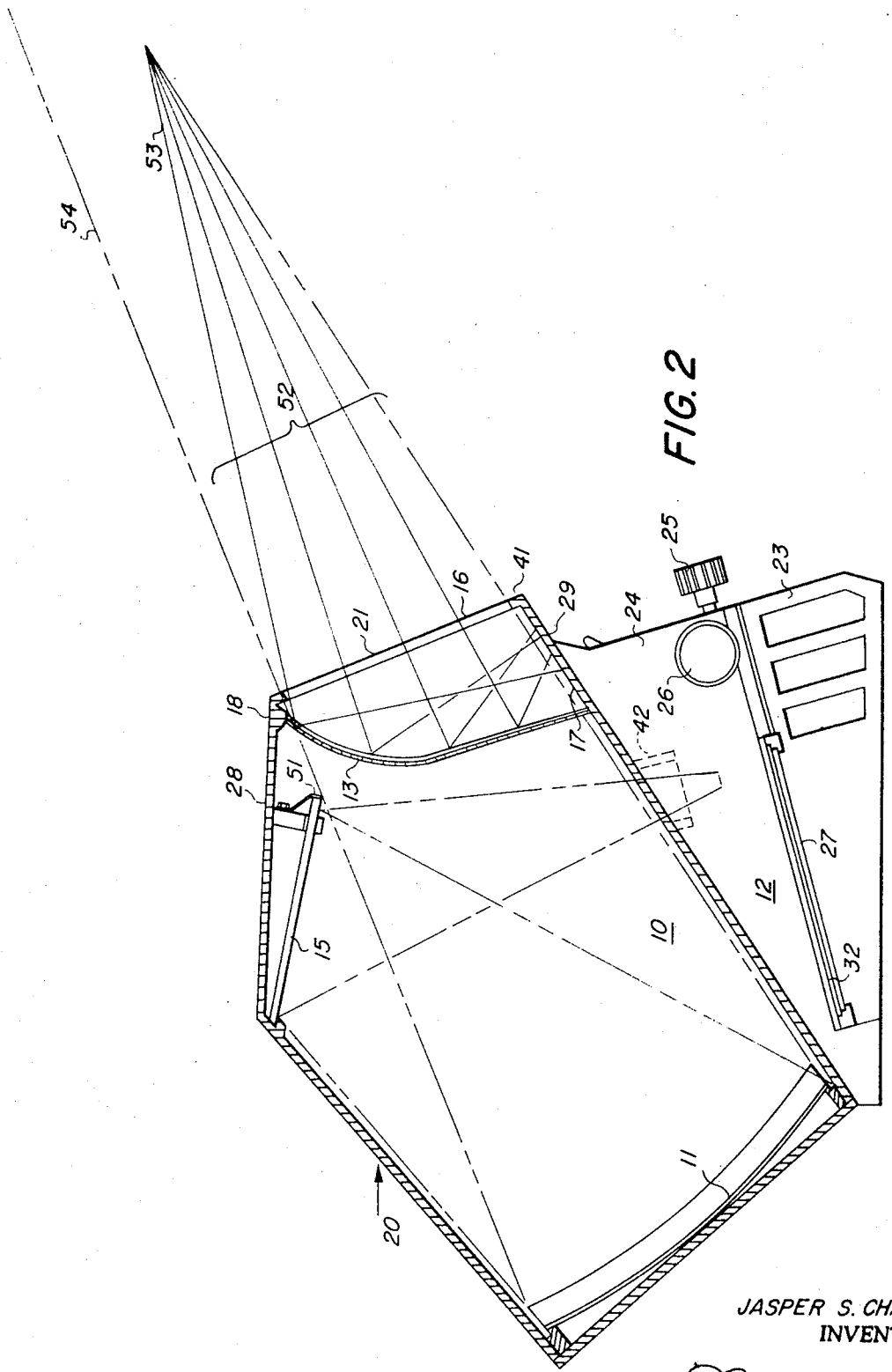
FIG. 2 is a side elevational view similar to that shown in FIG. 1 in which the filter is partially curved in one dimension for reducing the effective overhang of the viewer housing relative to the filter.
Figure 4A:
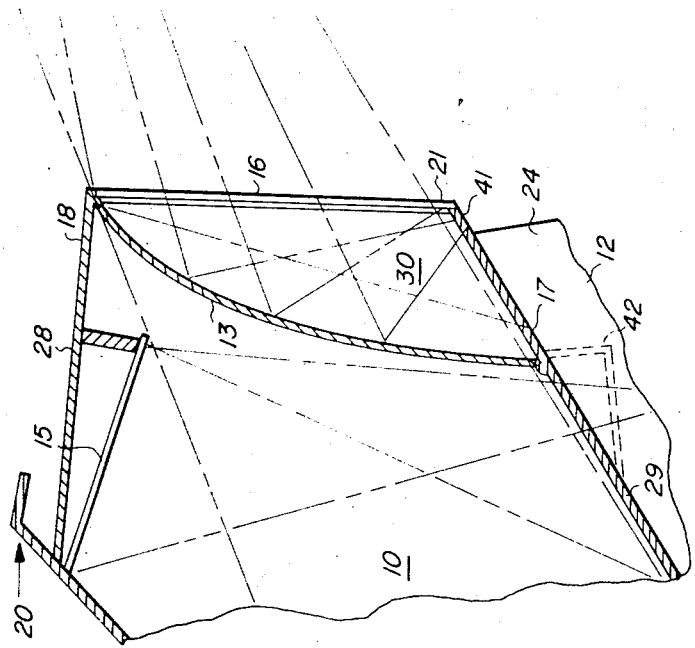
FIGS. 4a and 4b are partial, vertical sectional views of the viewer housing showing the changes effected in the viewer housing with a planar and a curved filter, respectively.
Figure 4B:
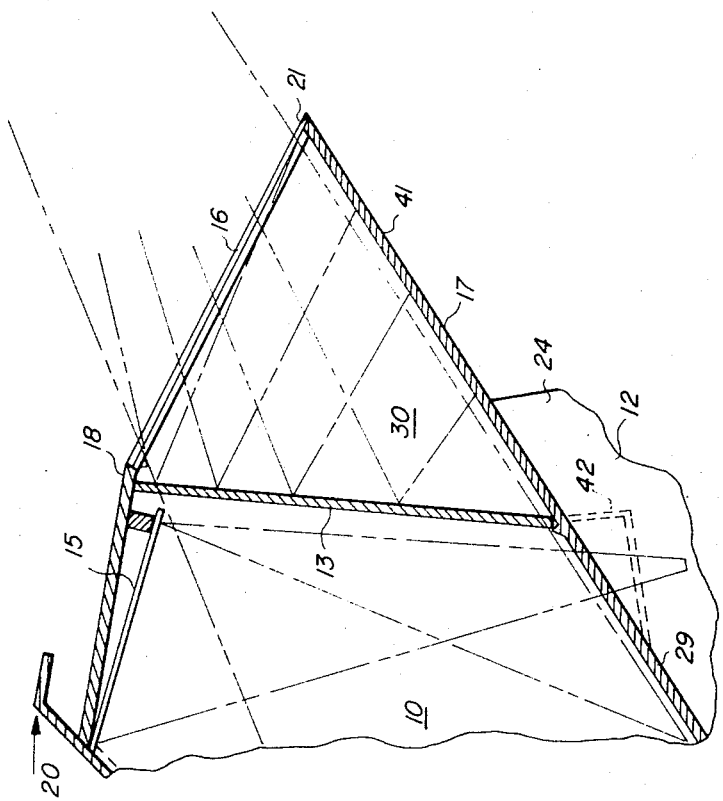

It has been found that the shroud 41 (particularly portion 17 of wall 29) can be reduced considerably if filter means 13 is slightly curved, see FIG. 2. This is true even though opening 16 might be of a larger size. Filter means 13 can be curved in one plane with the convex side toward the screen 11, as shown in FIG. 2, or can be curved throughout its length in one plane as seen in FIG. 4b. In either case, the portion 17 of wall 29 is materially reduced. With particular reference to FIG. 3, the optical axis 14 has been shifted to the left 14° relative to the normal at the screen center and in this embodiment the base member 12, which comprises a single unit, has been designed so filter means 13 and the opening 16 are shifted to the left, which results in an appropriately shorter housing with very little space required for filter means 13. In the embodiments shown in FIG. 2 and in FIG. 3, the curvature of filter means 13 is used to shorten the overall length of housing 10. In FIGS. 1–3 the line 54 shows the extent to which the opening 16 can be increased in height with curvature of filter means 13.

It would appear from FIGS. 1 and 2 that the advantages of filter means 13 can be attained only if the housing 10 is sufficiently long and extended far enough to the right of point 51, which indicates the edge of mirror 15, so as to provide for opening 16. The embodiment shown in FIG. 3 wherein a curved filter means is used permits the housing 10 to actually be shortened. This is made more clear by a comparison of FIGS. 4a and 4b. In FIG. 4a, filter means 13 is flat or planar and portion 17 must be relatively long if effective control of specular reflections is required. On the other hand, with filter means 13 curved, as in FIG. 4b, portion 17 is reduced considerably but portion 18 must be extended to provide the same control of specular reflections. Neither of these extremes lend themselves to the most desirable design. However, an intermediate embodiment, as shown in FIG. 3, permits the housing 10 to assume a more balanced and pleasing form.

In addition to greatly increasing the contrast characteristics of the image by effective rejection of ambient light, filter means 13 also raises the effective color temperature of the light source and optimizes the luminance of the image reflected by the screen when viewed through the opening. As a result, comfortable viewing can be experienced for an extended period of time.

Also, filter means 13 forms a dust-tight seal for the housing 10 relative to opening 16. Such a seal can be attained by providing a frame 35 that is fixed to or made integral with walls 28 and 29 and side walls 30, see FIG. 5. The frame can be faced with a sealing material 36, such as soft foam rubber, against which filter means 13 is positioned and maintained by a single retaining member 37 or by a plurality of suitable strips. Such a sealing structure can also be adapted to the curved type of filter means 13 disclosed in FIGS. 2, 3 and 4b. As an alternative to the aforementioned structure, filter means 13 can be sealed in position by means of a suitable cement and means for properly locating said filter.

With reference to FIG. 1, bottom wall 29 is provided with a sleeve portion 42 which extends into unit 24. Projection lens system 40 is slideably contained in a mount 43 on a plate 44 forming a part of unit 24. A soft rubber washer 45 that is positioned between sleeve 42 and mount 43 is slightly compressed when housing 10 is assembled with units 23 and 24 so that a seal is effected between housing 10 and unit 24. Consequently, the seal effected by filter means 13 and washer 45 provide means for sealing the housing against dust and dirt from the environs. With such a seal, screen 11, mirror 15, the inner surface of filter means 13 and the surface of lens system 40 that faces into housing 10 are protected against dust accumulation and physical damage. The interrelation of the housing 10 and units 23 and 24 is set forth in more detail in my above-mentioned copending application.

The invention has been described in detail with particular reference to several preferred embodiments thereof, but it will be understood that variations and modifications can be effected within the spirit and scope of the invention.

I claim:

1. A projection viewer comprising a housing having a viewing opening, a front surface screen within said housing and aligned with said opening, said screen providing directional reflectance of any light incident on the front surface thereof, an optical system for projecting an image onto said screen for viewing through said opening, and light balancing filter means arranged within said housing between said opening and said screen for optimizing the luminance of the image reflected by said screen when viewed through said opening.

2. The invention of claim 1 including means for sealing said housing against dust and dirt from the environs.

3. In a viewing apparatus comprising a housing having a viewing opening and a shroud for said opening, a front surface screen arranged within said housing, said screen being generally aspherical and providing directional reflectance of any light incident on the front surface thereof, and an optical system including a source of light for illuminating an image carrier medium and for projecting an image onto said screen for viewing through said opening, the improvement comprising:
light balancing filter means arranged within said housing between said viewing opening and said screen for optimizing the luminance of the image reflected by said screen when viewed through said opening, said shroud limiting ambient light incident on said filter means to that passing through said viewing opening and said filter means having at least a portion thereof curved toward said viewing opening so as to reflect ambient light incident thereon generally along lines directed toward interior surfaces of said shroud.

4. In a viewing apparatus comprising a housing having a viewing opening and a shroud for said opening, a front surface screen arranged within said housing, said screen being generally aspherical and providing directional reflectance of any light incident on the front surface thereof, and an optical system including a source of light for illuminating an image carrier medium and for projecting an image onto said screen for viewing through said opening, said improvement comprising:
light balancing filter means arranged within said housing between said viewing opening and said screen for compensating for the color temperature of said source of light and for optimizing the luminance of the image reflected by said screen when viewed through said opening.

5. The viewing apparatus in accordance with claim 4 wherein said shroud substantially limits any ambient light incident on said filter means to that reflectable by said filter means to the observers eyes onto the interior surfaces of said shroud.

6. The viewing apparatus in accordance with claim 4 wherein the color of said light balancing filter means is blue.

7. The viewing apparatus in accordance with claim 4 including means associated with said filter means for effecting a seal between said housing and said filter means.

8. The viewing apparatus in accordance with claim 4 wherein said light balancing filter means is generally flat throughout its entire length and width.

9. The viewing apparatus in accordance with claim 4 wherein at least part of said light balancing filter means is curved in one plane and in a direction convex toward said screen, whereby the curvature of said light balancing filter means is such that any ambient light passing through said viewing opening and incident on said light balancing filter means is reflected thereby onto interior surfaces of said shroud.

10. The viewing apparatus in accordance with claim 4 wherein said light balancing filter means comprises a light balancing filter and a neutral density filter arranged in generally contacting relation to each other.

11. The viewing apparatus in accordance with claim 10 wherein the color of said light balancing filter is blue and the maximum density factor of said density filter is about 0.4.

* * * * *

PO-1050
(5/69)

UNITED STATES PATENT OFFICE
CERTIFICATE OF CORRECTION

Patent No. 3,744,893   Dated July 10, 1973

Inventor(s) Jasper S. Chandler

It is certified that error appears in the above-identified patent and that said Letters Patent are hereby corrected as shown below:

Column 7, lines 4 and 5 delete "onto the interior surfaces of said shroud".

Signed and sealed this 10th day of September 1974.

(SEAL)
Attest:

McCOY M. GIBSON, JR.              C. MARSHALL DANN
Attesting Officer                 Commissioner of Patents